| United States Patent [19] | [11] Patent Number: 4,540,441 |
| Rado | [45] Date of Patent: Sep. 10, 1985 |

[54] SALT REMOVAL FROM TREATED TITANIUM DIOXIDE

[75] Inventor: Theodore A. Rado, Oklahoma City, Okla.

[73] Assignee: Kerr-McGee Chemical Corporation, Oklahoma City, Okla.

[21] Appl. No.: 491,263

[22] Filed: May 3, 1983

[51] Int. Cl.³ .............................................. C09C 1/36
[52] U.S. Cl. ................................... 106/300; 106/309; 106/308 B
[58] Field of Search ..................... 106/300, 309, 308 B

[56] References Cited

U.S. PATENT DOCUMENTS 3,804,655  4/1974  Hinley et al. ........................ 106/309

*Primary Examiner*—John Kight
*Assistant Examiner*—Marvin L. Moore
*Attorney, Agent, or Firm*—William G. Addison

[57] ABSTRACT

A method of removing aqueously soluble salt by-products produced by the treatment of raw titanium dioxide particles to add a finish thereto. The finished titanium dioxide particles with the salt are subjected to demineralization with mixed bed ion exchange resins to produce finished titanium dioxide particles substantially free of salt and salt forms of ion exchange resins. The finished titanium dioxide particles are recovered and the salt forms of ion exchange resins are regenerated to produce recoverable salt and reusable resins.

10 Claims, 1 Drawing Figure

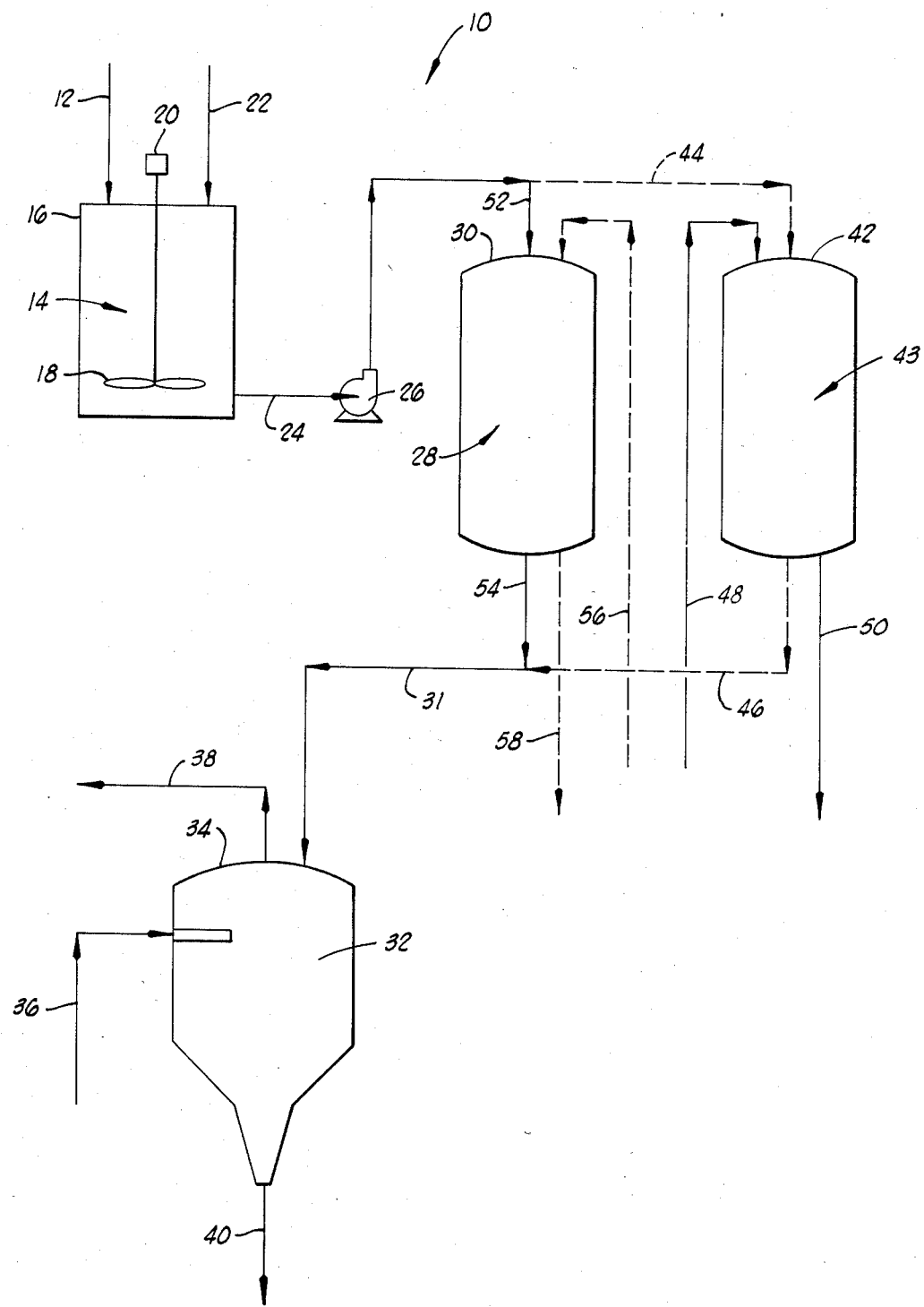

SALT REMOVAL FROM TREATED TITANIUM DIOXIDE

BACKGROUND OF THE INVENTION

1. Field of the Invention

The present invention relates generally to a method for removal of salts from pigmentary particles and, more particularly, but not by way of limitation, to a method in which titanium dioxide particles treated with a finish may be freed of by-product salts.

SUMMARY OF THE INVENTION

A method for producing titanium dioxide particles having a finish from raw titanium dioxide particles comprises the following steps. An aqueous slurry of raw titanium dioxide particles is prepared and passed into a treatment zone. In the treatment zone, the slurry is treated with finishing chemicals provided from a source to produce a treated slurry comprising titanium dioxide particles having a finish and by-product salts. A demineralization zone comprising beads of mixed bed demineralizing resins in their proton and hydroxide forms is provided and the treated slurry passed into the demineralization zone to produce a product slurry of substantially salt-free titanium dioxide particles having a finish and beads of mixed bed demineralizing resins in salt forms. The product slurry of substantially salt-free titanium dioxide particles having a finish is separated from the beads of mixed bed demineralizing resins in salt forms and the titanium dioxide particles having a finish are recovered therefrom.

BRIEF DESCRIPTION OF THE DRAWING

The single FIGURE in the drawing is a schematic, diagrammatic view showing the flow of materials in the process of the present invention.

DESCRIPTION OF THE PREFERRED EMBODIMENT

In the manufacture of titanium dioxide pigment, the raw titanium dioxide particles are coated with a finishing agent by forming hydrous oxides or other species which are precipitated on the surface of the particles. These coatings render the titanium dioxide particles compatible with secondary pigment components and solvents to be utilized.

The formation and precipitation of these finishing agents usually results in the formation of by-products which generally are aqueously soluble salts. These salts must usually be removed before the production of pigment may be completed. This salt removal has previously involved washings, repulpings and filtrations, which represent considerable effort and inefficiency. The present invention is a process obviating the above washings, repulpings and filtrations, thereby increasing the efficiency of pigment production.

Shown in the drawing is a process 10 for treating raw titanium dioxide particles with sodium aluminate and sulfuric acid in accordance with the present invention. The resultant finish on the titanium dioxide particles is hydrous aluminum oxide and the by-product salt, is sodium sulfate.

A slurry of raw titanium dioxide particles is passed through a conduit 12 into the treatment zone 14 formed in a treating tank 16 having an agitator 18 driven by a power source 20. While the slurry is being agitated, finishing chemicals comprising sodium aluminate and then sulfuric acid are introduced into the treatment zone 14 through a conduit 22. Separate conduits may be used for the introduction of finishing chemicals if desired in a particular application.

The interaction of these finishing chemicals results in the formation of a treated slurry comprising hydrous aluminum oxides precipitated as a finish on the raw titanium dioxide particles and dissolved sodium sulfate. Other finishing chemicals well known in the art, such as sodium silicate and sulfuric acid, for example, may be utilized in the process 10 of the present invention. If sodium silicate and sulfuric acid are utilized a treated slurry is produced comprising titanium dioxide particles having a finish of hydrous silicon oxides and dissolved sodium sulfate salt, for example.

The treated slurry is passed through a conduit 24 by a pump 26 into a first demineralization zone 28 formed in a first mixed bed demineralizer 30. The first demineralization zone 28 preferably comprises beads of mixed bed demineralizing resins in their proton and hydroxide forms.

In the first demineralization zone 28, preferably comprising a mixing chamber, the treated slurry and beads are mixed together. It should be noted that the treated slurry may be passed through a substantially stationary bed of the beads to accomplish a similar result, if desired in a particular application. With either of the above mentioned mechanisms, the slurry is intermingled with the beads to produce a product slurry of substantially salt-free titanium dioxide particles having a finish and beads of mixed bed demineralizing resins in salt forms.

The mixed bed ion-exchange resins are selected from the variety of strongly acidic resins such, as for example, those sold by the Dow Chemical Company as Dowex-50-hydrogen, Strongly Acidic Cation resins, or offered by the Rohm and Haas Company as Amberlite IR-120 plus, Strongly Acidic Cation Exchanger resins and also from the variety of strongly basic anionic resins offered by the Dow Chemical Company as Dowex-1-chloride, Strongly Basic Anion resins and by the Rohm and Haas Company as Amberlite IRA-400, Strongly Basic Anion Exchangers.

The product slurry then is separated for recovery of titanium dioxide particles having a finish. The recovery preferably is accomplished by passing the product slurry from the first demineralization zone 28 through a conduit 31 into a spray drying zone 32 formed in a spray drier 34. The spray drying zone 32 is supplied with hot gas provided through a conduit 36. Gases exit from the spray drier 34 through a conduit 38 and dried particles of titanium dioxide having a finish pass from the spray drier 34 through a conduit 40 for use or further processing. Generally such further processing involves passage of these particles to a micronizer (not shown) for producing micronized dried titanium dioxide particles having a finish and ready for final processing into a pigment.

The process 10 also includes a second demineralizer 42 having a second demineralization zone 43 form therein. The second demineralizer 42 is shown in its regeneration mode, the conduits for slurry addition 44 and exit 46 being dashed to indicate non-usage during this regeneration mode of operation.

Both demineralizers 30, 42 are of the mixed-bed demineralizer types, such as those commercially available from Permutit Corp., E. 49 Midland Ave., Paramus, N.J., for example.

Regeneration chemicals are passed into the second demineralization zone 43 through a conduit 48, these chemicals being aqueous sulfuric acid for cation-exchange resin beads and aqueous sodium hydroxide for the anion-exchange resin beads in the specific process 10 embodiment referred to before. The regeneration chemicals may be added by a single or different conduits; however, in either case, the beads first are subjected to bed fluidization to separate the similarly sized cation-exchange beads from the anion-exchange beads of another size so that the appropriate regeneration chemical reaches the appropriate type of bead. With the regeneration of either type of ion-exchange resin bead, sodium sulfate is washed from the resin and exits the second demineralizer 42 through a conduit 50. This sodium sulfate may be processed for recovery by removal of water and further processing if desired, in a particular application.

When regeneration of the mixed bed resins in the second demineralization zone 43 of the second demineralizer 42 is complete, the conduits 44 and 46 for passing the titanium dioxide containing slurry into and from the second demineralization zone 43, respectively, are opened, and the conduits 52 and 54 for passing the titanium dioxide containing slurry into and from the first demineralization zone 28 are closed so that the ion-exchange resins in the first demineralization zone 28 may be regenerated. Regeneration proceeds, as earlier described, for the resins in the second demineralization zone 43. Regeneration chemicals then are added to the resins in the first demineralization zone 28 through a conduit 56. Sodium sulfate washed from the resins passes from the first demineralization zone 28 through a conduit 58. The first demineralizer 30 then is ready for reuse.

The use of mixed-bed demineralization, in addition to the previously discussed advantages, offers a demineralization technique without pH swings which likely would be found with separate removal of anions and cations.

A resin-in-pulp technique, as widely used in the uranium industry, is equally applicable to the present invention and avoids the use of ion exchange resin-containing tanks, except for recovery and regeneration.

Changes may be made in the construction, operation and arrangement of the various parts, elements, steps and procedures described herein without departing from the concept and scope of the invention as defined in the following claims.

What is claimed is:

1. A method for producing titanium dioxide particles having a finish from raw titanium dioxide particles comprising:
    preparing an aqueous slurry of raw titanium dioxide particles;
    treating the slurry with finishing chemicals to produce a treated slurry comprising titanium dioxide particles having a finish and byproduct salts;
    treating the treated slurry with demineralizing resins in their proton and hydroxide forms to produce a slurry of substantially salt-free titanium dioxide particles having a finish and mixed bed demineralizing resins in salt forms; and
    recovering the substantially salt-free titanium dioxide particles having a finish from the mixed bed demineralizing resins in salt forms.

2. The method of claim 1 wherein the step of recovering the titanium particles having a finish is defined further to include the steps of:
    separating a product slurry of the substantially salt-free titanium dioxide particles having a finish from the mixed bed demineralizing resins in salt forms;
    passing the product slurry to a spray drying zone producing dried titanium dioxide particles having a finish;
    passing the dried titanium dioxide particles into a micronization zone for producing micronized dried titanium dioxide particles having a finish; and
    recovering the micronized dried titanium dioxide particles having a finish.

3. The method of claim 1 defined further to include the steps of:
    regenerating the mixed bed demineralizing resins in salt forms to produce regenerated demineralizing resins in their hydrogen and hydroxide forms; and
    recycling the regenerated resins for treating the treated slurry.

4. The method of claim 3 wherein the demineralizing resins are defined further as being cation-exchanging resins of one sizing and anion-exchanging resins of another sizing and the regeneration step is further defined as comprising the steps of:
    fluidizing a bed of the demineralizing resins in their salt forms substantially to separate cation-exchange resins from anion-exchange resins;
    regenerating the cation-exchange resins with flow of an aqueous solution of a mineral acid; and
    regenerating the anion-exchange resins with flow of an aqueous solution of an alkali metal hydroxide.

5. The method of claim 4 wherein the finishing chemicals are defined further as comprising sodium aluminate and sulfuric acid, and the by-product salts are defined further as comprising sodium sulfate, and the mineral acid is defined further as comprising sulfuric acid, and the alkali metal hydroxide is defined further as comprising sodium hydroxide, and regenerating the anion-exchange resin and cation-exchange resin is defined further as producing sodium sulfate.

6. The method of claim 4 wherein the finishing chemicals are defined further as comprising sodium silicate and sulfuric acid, and the by-product salts are defined further as comprising sodium sulfate, and the mineral acid is defined further as comprising sulfuric acid, and the alkali metal hydroxide is defined further as comprising sodium hydroxide, and regenerating the anion-exchange resin and cation-exchange resin is defined further as producing sodium sulfate.

7. The method of claim 5 wherein the method is defined further as comprising:
    recovering the sodium sulfate produced by regenerating the resins.

8. The method of claim 1 wherein the step of treating the treated slurry with demineralizing resins is defined further as treating the treated slurry with demineralizing resins in a substantially stationary bed of beads through which the treated slurry may pass.

9. The method of claim 1 wherein the step of treating the treated slurry with demineralizing resins is defined further as treating the treated slurry with demineralizing resins in a mixing chamber holding the beads with which the treated slurry is mixed.

10. The method of claim 1 wherein the mixed bed demineralizing resins are beads.

* * * * *